United States Patent
Bennett et al.

(10) Patent No.: US 9,513,845 B2
(45) Date of Patent: Dec. 6, 2016

(54) MEMORY MODULE VIRTUALIZATION

(71) Applicant: VIOLIN MEMORY INC., Mountain View, CA (US)

(72) Inventors: Jon C. R. Bennett, Sudberry, MA (US); Daniel C. Biederman, San Jose, CA (US)

(73) Assignee: VIOLIN MEMORY INC., Santa Clara, CA (US)

( * ) Notice: Subject to any disclaimer, the term of this patent is extended or adjusted under 35 U.S.C. 154(b) by 510 days.

(21) Appl. No.: 13/799,666

(22) Filed: Mar. 13, 2013

(65) Prior Publication Data

US 2013/0262739 A1 Oct. 3, 2013

Related U.S. Application Data (60) Provisional application No. 61/618,055, filed on Mar. 30, 2012.

(51) Int. Cl.
*G06F 3/06* (2006.01)
*G06F 12/12* (2016.01)
*G06F 12/02* (2006.01)

(52) U.S. Cl.
CPC .......... *G06F 3/0689* (2013.01); *G06F 3/0607* (2013.01); *G06F 3/0632* (2013.01); *G06F 3/0652* (2013.01); *G06F 3/0688* (2013.01); *G06F 12/0238* (2013.01); *G06F 12/121* (2013.01); *G06F 2212/7208* (2013.01)

(58) Field of Classification Search
CPC ..... G06F 3/0632; G06F 3/0607; G06F 3/0688
See application file for complete search history.

(56) References Cited

U.S. PATENT DOCUMENTS

| 5,859,960 | A |   | 1/1999  | Kurihara et al. |
|-----------|---|---|---------|-----------------|
| 5,875,457 | A | * | 2/1999  | Shalit ............ G06F 3/0619 711/111 |
| 8,200,887 | B2|   | 6/2012  | Bennett         |
| 2002/0161984 | A1 |  | 10/2002 | Lloyd-Jones    |

(Continued)

FOREIGN PATENT DOCUMENTS

| EP | 0 849 685 A2 | 6/1998 |
| JP | 07-311661 A | 11/1995 |
| WO | WO 00/72170 A1 | 11/2000 |

OTHER PUBLICATIONS

International Search Report and Written Opinion of the International Searching Authority for International Application No. PCT/US2013/034218, dated Jul. 31, 2013, 9 pages.

*Primary Examiner* — Edward Dudek, Jr.
(74) *Attorney, Agent, or Firm* — Brinks Gilson & Lione (57) ABSTRACT

A memory system having a plurality of modules operated so that a group of memory modules may operation in a RAID configuration having an erase hiding property. The RAID groups are mapped to areas of memory in each of the memory modules of the RAID group. More than one RAID group may be mapped to a memory module and the erase operations of the RAID groups coordinated such that the erase operations do not overlap. This may improve the utilization of a bus over which the memory module communicates with the controller. Where a memory module is replaced by a memory module having an increased storage capacity, the additional storage capacity may be mapped to an expanded logical address space.

18 Claims, 3 Drawing Sheets

(56) References Cited

U.S. PATENT DOCUMENTS

| | | | |
|---|---|---|---|
| 2003/0145167 A1* | 7/2003 | Tomita | G06F 3/0608 |
| | | | 711/114 |
| 2006/0112222 A1* | 5/2006 | Barrall | 711/114 |
| 2008/0120462 A1 | 5/2008 | Nehse | |
| 2008/0250270 A1* | 10/2008 | Bennett | 714/6 |
| 2009/0287880 A1* | 11/2009 | Wright | G06F 11/2069 |
| | | | 711/114 |
| 2010/0241797 A1* | 9/2010 | Kitahara | 711/103 |
| 2010/0306452 A1 | 12/2010 | Weber et al. | |

* cited by examiner

MEMORY MODULE VIRTUALIZATION

This application claims the benefit of U.S. 61/618,055, filed on Mar. 30, 2012, which is incorporated herein by reference.

BACKGROUND

The design of contemporary memory system architectures may include tradeoffs between cost, performance and the ability to upgrade, for example, the total memory capacity of the system. Memory capacity is commonly upgraded via memory modules or cards having a connector/socket interface. Often these memory modules are connected to a bus or interconnecting wiring disposed on a backplane to utilize system resources efficiently. In addition to upgradeability, many of these contemporary memory systems also require high throughput for bandwidth intensive applications, such as graphics, or data center memories.

Memories used in computing and communications systems include, but are not limited to, random access memory (RAM) of all types (e.g., S-RAM, D-RAM); programmable read only memory (PROM); electronically alterable read only memory (EPROM); flash memory (FLASH), magnetic memories of all types including Magnetoresistive Random Access Memory (MRAM), Ferroelectric RAM (FRAM or FeRAM) as well as NRAM (Nanotube-based/Nonvolatile RAM) and Phase-change memory (PRAM), and magnetic disk storage media. Other memories which may become suitable for use in the future include quantum devices and the like.

SUMMARY

A data storage system is disclosed having a controller; and a plurality of memory modules in communication with the controller over a bus. The controller is configured to manage the association of a global logical address space with a physical address space. Each memory module has a physical address range and the global logical address range is mapped to a physical address range, the global logical address range being greater or equal to the sum of the physical address ranges. When a memory module is replaced with a memory module having a larger physical address range, the additional physical address range is mapped to a previously unmapped range of the global logical address range.

In an aspect, the memory system is configured to store data in the memory modules in a RAID stripe using erase hiding.

When a memory module of the memory modules of the RAID stripe is replaced with a memory module having a larger physical memory address range than the replaced memory module, the additional physical memory address range in each replaced memory module is mapped to an unmapped logical address range in the global logical address range to create an expanded logical address space and the controller is operable to allocate a new RAID group logical address range selected from the expanded logical address space and to schedule memory operations of the new RAID group to provide erase hiding.

In an aspect, the erase operations of each memory module of the memory modules may be scheduled at a level of the memory module. Alternatively, the erase operations of a memory module of the memory modules may be scheduled for each portion of the physical memory address range of the memory modules forming a RAID group.

The physical address range of the a memory module of the memory modules may be configured as a first physical address range and a second physical address range, and the first physical address range and the second physical address range may be mapped to different RAID groups, such that erase operations of the first physical address range and the second physical address range may be scheduled so as not to completely overlap in time. In an aspect, the erase operations of the first physical address range and the second physical address range may be schedule so that the erase operations do not overlap in time.

Write operations may be performed when erase operations are not being performed and an erase operation period has been scheduled. Alternatively, separate periods for performing write operations may be scheduled. However the schedule should be arranged so that the erase hiding property of the storage is maintained for write operations as well. In such circumstances the period for write operations may differ in duration from that of the erase operation duration. This may accommodate the situation where multiple write operations may be performed during a period of a single erase operation.

A method of managing a memory system is described, where the memory system has a controller and memory modules. The method includes operating the controller to configure the system by associating a logical address range of a global logical address range to a physical address range in each of the memory modules. The controller may recognize that a memory module has been replaced with a memory module having an increased physical memory address range and be operative to extend the logical address range to encompass the increased physical memory and associate a corresponding logical address range to the increased physical address range.

The controller is operable to configure a group of the memory modules having an increased physical memory range as a RAID group having erase hiding properties.

The erase operations may be scheduled for an entire memory module or the portion of the memory module corresponding to a physical address range of the memory included in a RAID group. The physical address space of the memory module of the memory modules may be configured as a first physical address range and a second physical address range, and the first physical address range and the second physical address range may be mapped to different RAID groups. Erase operations of the first physical address range and the second physical address range may be scheduled so as not to completely overlap in time. Alternatively, the erase operations of the first physical address range and the second physical address range are scheduled so that the erase operations of the two RAID groups stored in a module do not overlap in time.

In another aspect, a method of managing a memory system having a controller and memory modules includes: operating the controller to configure the system by associating a logical address range of a global logical address range to a physical address range in each of the memory modules; forming a RAID group having erase hiding properties from a first plurality of memory modules of the memory modules; forming a second RAID group having erase hiding properties from a second plurality of memory modules of the memory modules, the first RAID group and the second RAID group sharing at least one memory module.

The physical address space of a memory module of the memory modules is configured as a first physical address range and a second physical address range, and the first physical address range and the second physical address range are mapped to different RAID groups, and erase operations of the first physical address range and the second physical address range are scheduled so as not to completely overlap in time. Alternatively, the erase operations of the first physical address range and the second physical address range are scheduled so that they do not overlap in time.

A computer program product has instructions for configuring a processor and memory modules by operating the processor to configure the system by associating a logical address range of a global logical address range to a physical address range in each of the memory modules; recognizing that a memory module has been replaced with a memory module having an increased physical memory address range; expanding the logical address range to encompass the increased physical memory and associating a corresponding logical address range to the increased physical address range.

BRIEF DESCRIPTION OF THE DRAWINGS

FIG. 3 A is a representation of the physical memory space of a memory module; B is a representation of the physical memory space of a memory muddle having four times the capacity of the memory module shown in A, with the logical memory space of A mapped to a range of locations in the expanded memory; and C, is a representation of B, where additional logical storage areas are mapped to the unallocated areas of B.

DESCRIPTION

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

When describing a particular example, the example may include a particular feature, structure, or characteristic, but every example may not necessarily include the particular feature, structure or characteristic. This should not be taken as a suggestion or implication that the features, structure or characteristics of two or more examples, or aspects of the examples, should not or could not be combined, except when such a combination is explicitly excluded. When a particular aspect, feature, structure, or characteristic is described in connection with an example, a person skilled in the art may give effect to such feature, structure or characteristic in connection with other examples, whether or not explicitly set forth herein.

It will be appreciated that the methods described and the apparatus shown in the figures may be configured or embodied in machine-executable instructions; e.g., software, hardware, or in a combination of both. The instructions can be used to cause a general-purpose computer, a special-purpose processor, such as a DSP or array processor, an application specific integrated circuit (ASIC), a field programmable gate array (FPGA) or the like, that is programmed with the instructions to perform the operations described. Alternatively, the operations might be performed by specific hardware components that contain hardwired logic or firmware instructions for performing the operations described, or may be configured to so, or by any combination of programmed computer components and custom hardware components, which may include analog circuits.

The methods may be provided, at least in part, as a computer program product that may include a machine-readable medium having stored thereon instructions which may be used to program a computer (or other electronic devices), or a FPGA, or the like, to perform the methods. For the purposes of this specification, the terms "machine-readable medium" shall be taken to include any medium that is capable of storing or encoding a sequence of instructions or data for execution by a computing machine or special-purpose hardware and that cause the machine or special purpose hardware to perform any one of the methodologies or functions of the present invention. The term "machine-readable medium" shall accordingly be taken include, but not be limited to, solid-state memories, optical and magnetic disks, magnetic memories, optical memories, or other functional equivalents. The software program product may be stored or distributed on one medium and transferred or re-stored on another medium for use.

For example, but not by way of limitation, a machine readable medium may include: read-only memory (ROM); random access memory (RAM) of all types (e.g., S-RAM, D-RAM); programmable read only memory (PROM); electronically alterable read only memory (EPROM); magnetic random access memory; magnetic disk storage media; FLASH; or, other memory type that is known or will be developed, and having broadly the same functional characteristics.

Furthermore, it is common in the art to speak of software, in one form or another (e.g., program, procedure, process, application, module, algorithm or logic), as taking an action or causing a result. Such expressions are merely a convenient way of saying that execution of the software by a computer or equivalent device causes the processor of the computer or the equivalent device to perform an action or a produce a result, as is well known by persons skilled in the art.

A memory system may be comprised of a number of functional elements, and terminology may be introduced here so as to assist the reader in better understanding the concepts disclosed herein. However, the use of a specific name with respect to an aspect of the system is not intended to express a limitation on the functions to be performed by that named aspect of the system. Except as specifically mentioned herein, the allocation of the functions to specific hardware or software aspects of the system is intended for convenience in discussion, as a person of skill in the art will appreciate that the actual physical aspects and computational aspects of a system may be arranged in a variety of equivalent ways. In particular, as the progress in the electronic technologies that may be useable for such a system evolves, the sizes of individual components may decrease to the extent that more functions are performed in a particular hardware element of a system, or that the scale size of the system may be increased so as to encompass a plurality of system modules, so as to take advantage of the scalability of the system concept. All of these evolutions are intended to be encompassed by the recitations in the claims.

Memory systems may be designed with both hardware and software redundancy. One of the common techniques for storing data in a redundant fashion in a memory system is RAID. The concept of RAID (Redundant Arrays of Independent (or Inexpensive) Disks) dates back at least as far as a paper written by David Patterson, Garth Gibson and Randy H. Katz in 1988. RAID allows disks memory systems to be arranged so as to protect against the loss the data that they contain by adding redundancy. In a properly configured RAID architecture, the loss of any single disk, for example, will not interfere with the ability to access or reconstruct the stored data. The Mean Time Between Failure (MTBF) of the disk array without RAID will be equal to the MTBF of an individual drive, divided by the number of drives in the array, since the loss of any disk results in a loss of data. Because of this, the MTBF of an array of disk drives would be too low for many application requirements. However, disk arrays can be made fault-tolerant by redundantly storing information in various ways.

"Bus" or "link" means a signal line or a plurality of signal lines, each having one or more connection points for "transceiving" (i.e., either transmitting, receiving, or both). Each connection point may connect or couple to a transceiver (i.e., a transmitter-receiver) or one of a single transmitter or receiver circuit. A connection or coupling is provided electrically, optically, magnetically, by way of quantum entanglement or equivalents thereof. Other electrical connections, by the same or similar means are used to provide for satisfaction of such additional system requirements as power, ground, auxiliary signaling and control, or the like. Such additional connections are occasionally described so as to clarify the description, however such additional connections are well known to persons skilled in the art, and the lack of description of these connections in any example should not be taken to exclude their inclusion.

A memory system may be configured to operate with one or more associated servers, and such memory systems may be termed "directly attached storage" (DAS). An example of such a system is the Violin Memory 3200 FLASH memory system (available from Violin Memory, Inc, Mt. View, Calif.) which can interface with a server using, for example, a PCIe (PCIexpress) bus having one or more channels. Alternatively, the same or similar memory system such as the Violin Memory 6000 FLASH memory system may interface with a networked environment in a Storage Area Network (SAN), or as Network Attached Storage (NAS), using a protocol converter, bridge or other technique or device. The connections between the user, the servers and the memory storage may be any of the known or subsequently developed forms of data transport including the worldwide web (WWW, Internet), Ethernet, wide or local area networks (WAN, LAN), optical networks, radio networks, or the like. Some of these communication means are broadly referred to as the "cloud" and a person of skill in the art would understand that this is a rapidly evolving term and the use of such a term is not intended to be a limitation. Rather, connection in the "cloud" broadly means that the user and the server have some means of interconnection which is substantially transparent to the user. Dedicated interconnections may also be used.

Large memory systems as may be used in large data centers or in providing service through the "cloud" may service a plurality of individual using applications, and such applications may be independent of each other, as in virtualized systems. Alternatively, a plurality of applications may access and operate on a common memory area, such as where data has been de-duplicated, and is accessed by a plurality of users. The memory system may thus be partitioned, for example, into private (exclusive) memory areas or into shared memory areas, or any combination or variation thereof: a memory location, or range thereof, being subject to configurable access criteria. Depending on the specific needs of an application or user, the memory areas may be configured so as to have different reliability, access time, bandwidth and other characteristics, such as data protection (e.g. RAID, backups), data security (e.g., encryption) de-duplication or data compression. In an example, these characteristics may be expressed, for example as a selection of the RAID type to be employed, the striping of the data (wide or narrow, for example) and other selectable system attributes, such as the bandwidth of the port through which a server accesses the memory system. These attributes may be embodied in hardware, or configurable by an algorithm, data table, or the like.

Figure 1:
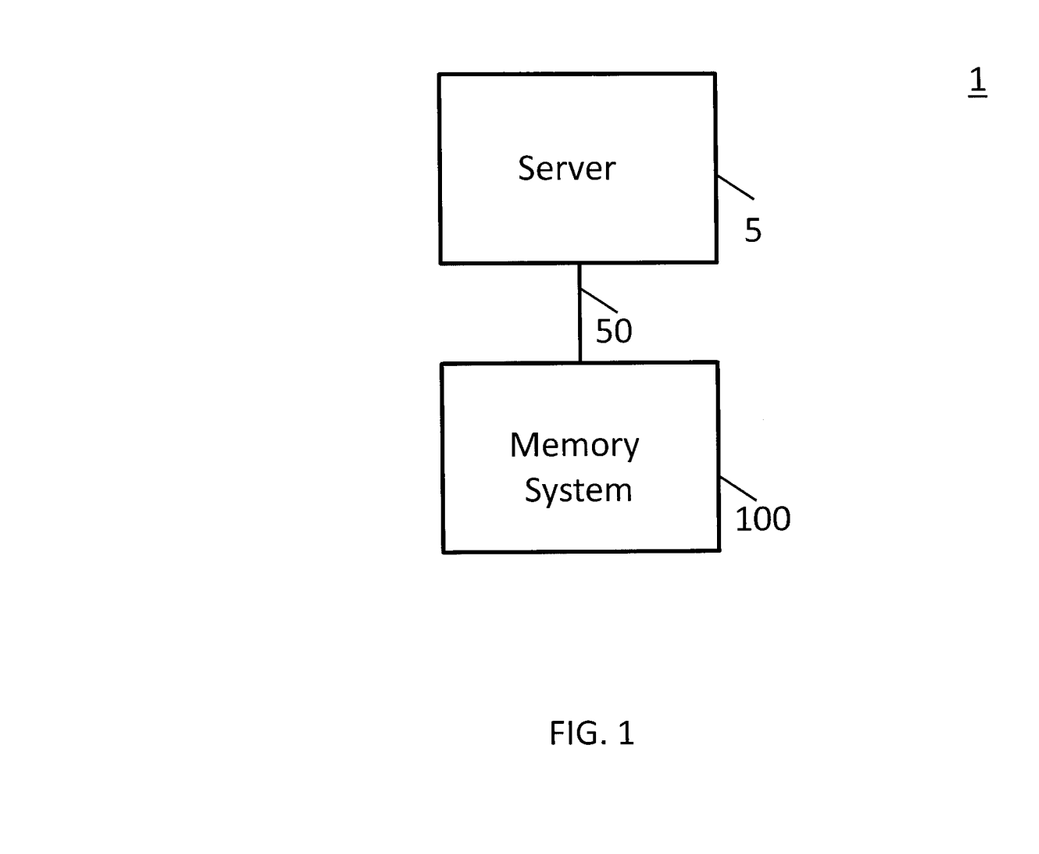
FIG. 1 is a block diagram showing a server in communication with a memory system.

An example computing system 1, shown in FIG. 1, may comprise a server 5, or other source of requests to perform operations on a memory system 100. The most common user-initiated operations to be performed are reading of data from an address in the memory system 100 for return to the server 5, or writing data provided by the server 5 to an address in the memory system 100. The data to be read or written may comprise, for example, a single address or a block of addresses, and may be described, for example, by a logical block address (LBA) and a block size.

A memory system 100 may be comprised as a plurality of memory modules MM communicating with a memory controller 10, which may be a plurality of 10, each of which may communicate with a server 5. The MM may be a plurality of solid state memory circuits having the capability of storing data for random access by a user. At present such memory circuits are packaged so as to be attached to circuit boards. Each memory circuit may have a capability of storing, for example, 32 MB of binary data. The access characteristics (e.g., read time, write time, data block size, data retention time, error rate, and the like) are dependent on the specific technology used, the manufacturer, and industry standards (formal or informal) existing at a particular time. These constraints are often embodied in the design of products.

However, as is well known in the industry, an observation, known as Moore's Law, expresses the evolution of semiconductor devices in terms of a doubling of capacity (however defined) and a concomitant reduction of cost for any capability over a relatively short time period (perhaps 18-24). Thus, it may be expected that a particular physical memory module may experience a doubling, a quadrupling, or higher a multiplicative increase in capacity or capability over a product family lifetime, due to an increase in storage density or other architectural changes. A chassis designed for modules having a total physical memory capacity of, for example 10 TB (terabytes), may eventually be able to hold modules having a total capacity of 20 TB, 40 TB or more, without a significant increase in power consumption. However, this may mean that an individual memory module MM that had a capacity of 250 GB now has a capacity of 1 TB. Some or all of this increase in capacity may be achieved by replacing existing modules in the memory system with modules having higher storage capacity as the existing installed modules reach the end of life, and some of the increase may be by adding chassis with the larger storage capacity modules. So, in some cases, smaller storage capacity modules may be mixed with larger storage capacity modules.

By whatever means the increase in memory storage capacity is achieved, the total addressable memory space will be substantially increased. In some applications, individual modules MM of the memory system 100 are separately managed in accordance with a policy or protocol. For example, a time period where the module performs erase operations on a FLASH memory circuit may be constrained so that only one of a group of modules is performing an erase operation at one time, so that the effect of erase operations on read latency may be "hidden" from the user. Such operations are described in U.S. Pat. No. 8,200,887, entitled "Memory Management System and Method", which is commonly owned and is incorporated herein by reference. As the physical memory capacity of the module increases, the address range of the region subject to a particular operational scenario may become unwieldy and reduce the performance of the overall memory.

Figure 2:
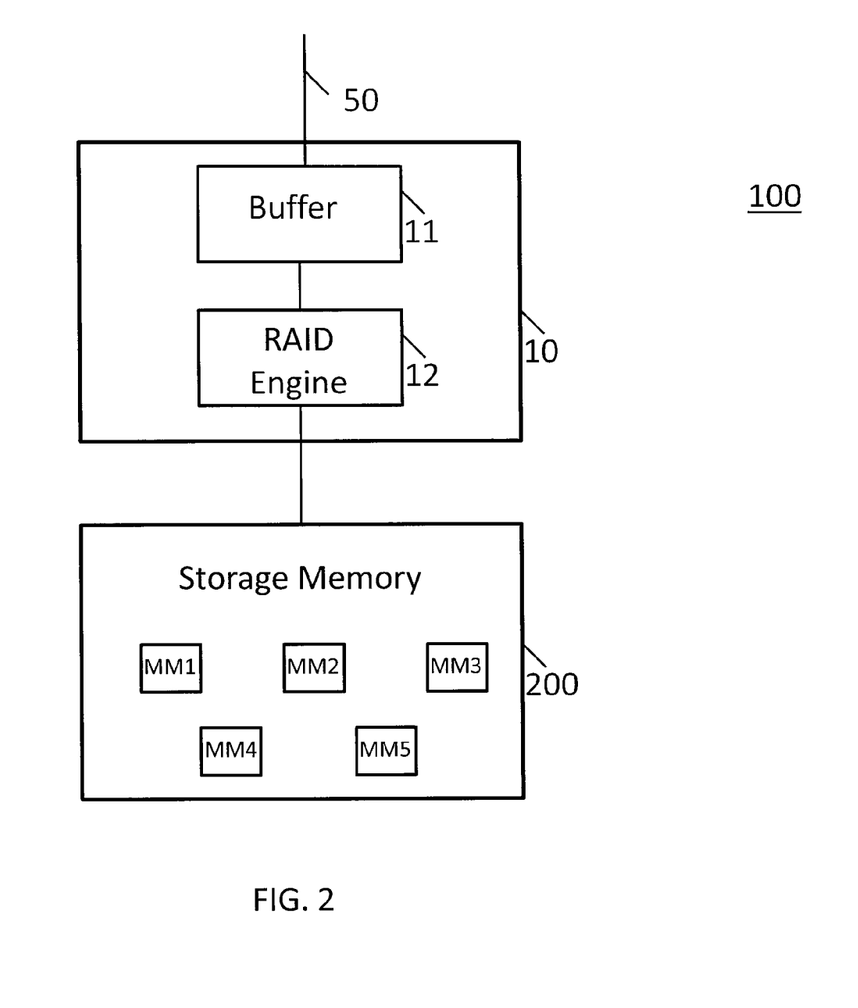
FIG. 2 is a block diagram of the memory system having a plurality of memory modules configured for operation as a RAID group.

FIG. 2 shows a simplified diagram of the memory system 100 in an example where there is a single memory 10 controller and 5 memory modules. Each memory modules has a physical quantity of memory M and, in this example, each of the memory modules may be subject to a single set of access constraints. That is, for example, the erase time window position and the erase time duration. For simplicity, the timing constraints are assumed to be the same for each memory module. Such a configuration may be used to store data using the RAID concept, where modules MM1-MM4 are used, for example, to store the user data and module MM5 is used to store parity data computed from the user data.

The memory controller may send data to the individual modules in accordance with an addressing scheme which may be, for example, a module base address $A_m$, and an offset K where $A_m+K$ (where $K_{max}=M$) is the actual address of the data in a flat address space representing the memory system 100. Thus $A_1+K_{max}+1=A_2$. In this case, one may associate the index m with the number of the memory module MM.

Over time, the same bus and controller architecture may support configurations using memory modules that have a much larger capacity, for example 4M. The address space created may be too large to effectively manage using the algorithms and rules developed for the original memory size. So, a restructuring of the memory allocations may be needed. But, such a restructuring may be difficult if the introduction of the new memory module sizes requires the relocation of large amounts of data. The time to perform such relocation, and impact on system performance, may be unacceptable. In many uses of large memory systems, the memory system 100 needs to remain on line during the upgrade, and continue to perform at a predetermined level.

Some memory system designs are capable of hot swapping of memory modules. Typically this feature is found in high availability designs, where a failed or worn-out memory module can be replaced while the system is operating. In such systems at least one spare module may be installed so that the data can be migrated to the spare module. Alternatively, the failed module may be replaced in the same physical location. Where the system uses RAID, the RAID is used to reconstruct the data of a failed module to the spare or replacement module or the spare module.

Figure 3:
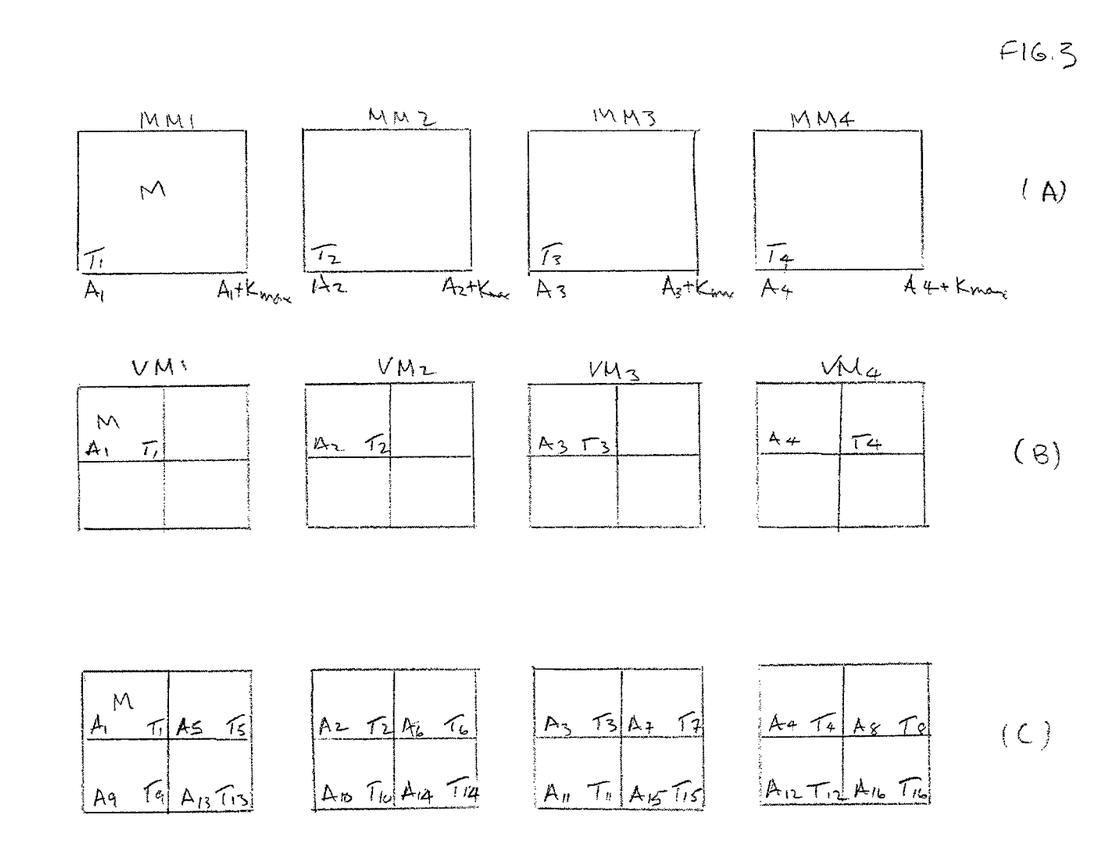

FIG. 3A shows the address ranges of four memory modules of capacity M, where, for example, MM1, MM2 and MM3 are data and MM4 is parity data computed over a stripe of data stored on MM1, MM2 and MM3.

If a memory module with a memory capacity M were to be replaced with a memory module of capacity 4M, then the data on module of address range A1 on M1 could be migrated to the new module. Since the data only has an extent of M, there exists 3M spare memory area on the module. This spare area may be used to receive, for example, the data of address ranges A2, A3 and A4 so that the memory modules MM2, MM3, and MM4 may also be replaced. However, unless the portions of the new memory module (for this example, M5, which was the spare module) where the address ranges A1, A2, A3 and A4 are treated as having separate access constraints, each of the address ranges would now be governed by the access criteria originally intended for A1. But, then, the erase windows would completely overlap and there would be read blockage due to erasing.

In an aspect, the new larger storage capacity memory module may be logically partitioned such that there are four memory areas, each memory area having a size equal to M, the original memory size. The access constraints for each of the memory areas. B1, B2, B3, B4 would correspond to those of the MM1, MM2, MM3, and MM4 from which the data had been relocated. Typically the partitioning of a memory module MM would be governed by some physical criteria, such as associating a memory area B with a group of memory chips of the memory module, an interface for a group of chips, or the like. However, this is not necessary.

To move the data at A2 of MM2, A3 of MM3 and A4 of MM4 to the same module as that of A1 of MM1 may, however, be inadvisable as, if RAID is being used, the protection against single module failure resulting in a loss of data would be obviated if any two data of any two of the memory modules of the RAID stripe is now stored on a single module, as the parity information is no longer sufficient to recover the lost data. While we have shown a small number of memory modules MM in this example, a typical memory system could have tens or more memory modules, and the data in a RAID stripe may be located almost anywhere in the physical memory, as groups of memory modules will have appropriate access constraints so as to be available to store data in a RAID format if wide data striping is used.

In another example, the data from module MM1, corresponding to address range A1 of MM1 is moved to module MM5, which was, for example a spare module with the increased memory capacity, 4M. We may logically reassign the address range of MM5 so that it corresponds to that of A1, and de-allocate it from MM1 as a physical location. So, from now on, data in the address range A1 will be routed to physical module MM5 as a virtual equivalent of the original MM1, which may be designated VM1. MM1 may be rere-placed with a new module having a data storage capacity 4M. Data from MM2, corresponding to address range A2 may be migrated to MM1 until all of the data in MM2 has been moved to MM1. Then address A2 may be de-allocated from MM2 and allocated to VM1. MM2 may then be replaced, and so on.

When all of the memory modules MM1-5 have been replaced with modules each having a capacity of 4M, the situation may be as shown in in FIG. 3C. Each of the address ranges is associated with a physical memory module MM as before, but three quarters of the storage capacity of the memory module is unused. One may now increase the accessible memory in the memory system by a factor of four and assign memory ranges to the available memory in accordance with a schema. One such approach is to assign the memory address ranges as being equal in size to the original memory address ranges, modulo the number of memory modules in the memory system (including or excluding the spares, depending of the schema chosen).

FIG. 3B shows the additional memory address ranges allocated. The memory areas are now available to be accessed by the user. The memory controller 10 may translate the user addresses into logical addresses within the memory system, compute RAID stripes, if desired, and store and retrieve data from the newly allocated logical memory. Often this new memory area will be allocated as ranges of memory to accessible specific users as logical unit numbers (LUN) and an address within the LUN. Upon receiving a (e.g., typically, read or write) command in the form of a LUN and address within the LUN, the MC would resolve the address into a system logical address for routing to the appropriate physical MM or group of MMs. The MM can perform any further address resolution that is needed using, in the case of FLASH memory, an abstraction known as a Flash Translation Layer (FTL).

Where the data of a physical MM having common access criteria is moved to another module having the same common access criteria, the system characteristic responses are not changed. So, regardless of the method by which the user data are distributed across the memory modules MM, the data is moved to a compatible memory location so as to preserve the expected system performance: e.g., RAID protection, response time, or the like.

As shown in FIG. 3C, the three unallocated memory regions of the larger storage capacity MM may be treated as the equivalent of three separate memory modules and configured with different access criteria. These new memory regions may be configured such that a group of virtual memory modules may be formed from the new memory areas having compatible access criteria. For example, a different type of RAID may be used. The duration of the erase window, for example, may be different so as to better optimize performance, or the like. This may be represented by characterizing the partitioned memory has having a time parameter $T_m$ where the value of $T_m$, may be, for example, a tuple (D, E) representing a time relationship of the erase window to that of the system timing (D), and the duration of the erase window (E).

A RAID group may be formed from, for example a plurality of memory regions A each having a different value for D and the erase window E such that the erase windows of the RAID group do not overlap. In such an arrangement, the power requirements of a memory module may be more evenly distributed in time, and the peak currents on power circuits mitigated. Similarly, the appropriate scheduling of the erase windows may be used so as to better manage the bandwidths of the internal and the external data busses, as well as any cache memory used to buffer write data during a read period or during erases. For example, by scheduling the erase times of a memory module that has been virtualized into four parts, a data buffer for write data need only be sized based on one of the four parts. Alternatively the data buffer may be larger and permit storing of additional data for a particular memory module partition during a peak operating period.

Dynamic changes may be made to the access criteria on the basis of the virtualized memory regions. Large memory systems often service a plurality of heterogeneous users. The ebb and flow of data varies for each user as a function of time of day, day of month and other factors, so that the peak demand for particular types of services such as updating data bases, loading new data sets, backups and the like may not either be predictable or controllable. So, some of the memory modules MM may temporarily postpone housekeeping operations so as to reduce the overhead; some of the erase windows may be permitted to overlap so as to increase the number blocks of FLASH memory that can be reclaimed per unit time, and the like. By virtualizing the use of the memory modules MM as the capacity increases, the granularity of control of memory system response characteristics is not compromised. While there may be some occasional bottlenecks in memory operation, the amount of the overall memory system that would be affected may be controlled, thus reducing the observability of these optimizations to the user.

Housekeeping operations may be performed on a memory module, or on partitions thereof. Where the partitions correspond to physical memory circuits, the virtualization may be used so that a failure of a memory chip or sub-controller may be limited to less than the entire pluggable module. By coordinating the housekeeping operations across the entire memory module, a common pool of available erased blocks may be maintained, so that wear may be spread across the entire memory space of the memory module, regardless of the actual usage as seen by the user.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A system, comprising:
    a controller operable to accept commands for reading or writing data; and
    a plurality of memory modules each memory module having a physical address range, including a spare memory module, in communication with the controller over a bus;
    wherein the controller is configured to:
    store data in a group of memory modules of the plurality of memory modules configured as a RAID group with erase hiding;
    migrate data from a first memory module of the plurality of memory modules to the spare memory module while maintaining erase hiding;
    determine when the first memory module is replaced with a memory module having a larger physical address range;
    manage an association of a global logical address space having a range at least equal to a maximum system physical address space: wherein each memory module has a physical address range and addresses of the global logical address space are mapped to the physical address range; a mapped range of the global logical address space being a sum of the physical address ranges of the memory modules; and
    the larger physical address range of the memory module is mapped to a previously unmapped range of addresses of the global logical address-space.

2. The system of claim 1,
    wherein when the memory module having the larger physical memory address range replaces a memory module of the system the controller is operable to create a new RAID group including the memory modules of an existing RAID group and to move data stored in another memory module of the existing RAID group to the memory module having the larger physical memory address range.

3. The system of claim 2, further comprising:
    the controller operable to schedule memory operations of the new RAID group to provide erase hiding.

4. The system of claim 3, wherein erase operations of each memory module of the memory modules are scheduled at a level of the memory module.

5. The system of claim 3, wherein erase operations of a memory module of the memory modules are scheduled for each portion of the physical memory address range of the memory modules forming a RAID group.

6. The system of claim 3, wherein the physical address range of the memory module of the memory modules having the larger physical memory address range is configured as a first physical address range corresponding to moved data and a second physical address range, and the first physical address range and the second physical address range are mappable to different RAID groups.

7. The system of claim 6, wherein erase operations of the first physical address range and the second physical address range do not overlap in time.

8. The system of claim 6, wherein write operations may be performed during an erase window when an erase operation is not being performed.

9. The system of claim 6, wherein a write window is substituted for an erase window.

10. The system of claim 9, wherein a write window duration is different than an erase window duration.

11. A method of managing a memory system having a controller and memory modules, including at least one spare memory module, comprising:
operating the controller to configure the memory system by associating a logical address range of a global logical address range to a physical address range in each of the memory modules;
forming a RAID group from an existing RAID group and at least a portion of the spare memory module, configured to perform erase hiding;
moving data of a memory module of the existing RAID group to the spare memory module while maintaining erase hiding;
recognizing that the memory module has been replaced with a memory module having an increased physical memory address range; and
expanding the logical address range to accommodate the increased physical memory address range of the memory module,
wherein the global logical address range is at least equal to a maximum physical address capacity.

12. The method of claim 11, wherein the physical address space of the added memory module is configured as a first physical address range having the moved data and a second physical address range, and the first physical address range and the second physical address range are mapped to different RAID groups, and erase operations of the first physical address range and the second physical address range are scheduled so as not to completely overlap in time.

13. The method of claim 12, wherein the erase operations of the first physical address range and the second physical address range do not overlap in time.

14. A computer program product, stored on a non-volatile computer readable memory, comprising:
instructions for configuring a processor to manage a memory system having a processor and memory modules, including a spare memory module and configured to store data using RAID and erase hiding, by:
operating the processor to configure the memory system by associating a logical address range of a global logical address range to a physical address range in each of the memory modules;
migrating data from a memory module to the spare memory module;
recognizing that the memory module has been replaced with a memory module having an increased physical memory address range; and
increasing the associated logical address range to encompass the increased physical memory address range and associating the increased logical address range with the increased physical address range.

15. The method of claim 11, wherein, after data is moved to the added memory module:
configuring the added memory module to which the data has been migrated as a part of the RAID group of the module from which the data has been migrated; and
removing from the memory system the memory module from which the data was moved.

16. The method of claim 15, where the removed memory module is replaced with a new spare memory module.

17. The method of claim 16, wherein data from another memory module of the RAID group is moved to the new spare memory module.

18. The method of claim 16, wherein the step of replacing the removed memory is repeated until all of the data has been moved to memory modules having increased physical address range.

* * * * *